United States Patent [19]
Hurley et al.

[11] Patent Number: 5,844,009
[45] Date of Patent: Dec. 1, 1998

[54] CROSS-LINKED LOW-DENSITY POLYMER FOAM

[75] Inventors: Robert F. Hurley, Centerville; John D. Bambara, Osterville, both of Mass.; Michael Bambara, Herkimer; Richard Bambara, Cooperstown, both of N.Y.

[73] Assignee: Sentinel Products Corp., Hyannis, Mass.

[21] Appl. No.: 638,122

[22] Filed: Apr. 26, 1996

[51] Int. Cl.[6] .................................................. C08J 9/04
[52] U.S. Cl. ................................ 521/112; 521/79; 521/80; 521/91; 521/93; 521/110; 521/142; 521/143; 521/149
[58] Field of Search ............................... 521/79, 80, 112, 521/143, 149, 142, 91, 93, 110

[56] References Cited

U.S. PATENT DOCUMENTS

| | | |
|---|---|---|
| 2,254,203 | 9/1941 | Bender . |
| 2,387,730 | 10/1945 | Alderson . |
| 2,450,436 | 10/1948 | McIntire . |
| 2,515,250 | 7/1950 | McIntire . |
| 2,740,157 | 4/1956 | McCurdy et al. . |
| 2,988,777 | 6/1961 | Bieber et al. . |
| 3,067,147 | 12/1962 | Rubens et al. . |
| 3,098,831 | 7/1963 | Carr . |
| 3,098,832 | 7/1963 | Pooley et al. . |
| 3,238,565 | 3/1966 | Jacobs . |
| 3,287,477 | 11/1966 | Vesilind . |
| 3,335,892 | 8/1967 | Hildreth . |
| 3,338,864 | 8/1967 | Megall et al. . |
| 3,346,686 | 10/1967 | Collins . |
| 3,379,802 | 4/1968 | Ralery et al. . |
| 3,396,062 | 8/1968 | White . |
| 3,399,098 | 8/1968 | Omoto et al. . |
| 3,413,387 | 11/1968 | Ohsol . |
| 3,413,388 | 11/1968 | Lux et al. . |
| 3,431,163 | 3/1969 | Gilbert . |
| 3,431,164 | 3/1969 | Gilbert . |
| 3,539,473 | 11/1970 | Simpson et al. . |
| 3,565,243 | 2/1971 | Freeman . |
| 3,639,304 | 2/1972 | Raley, Jr. . |
| 3,644,230 | 2/1972 | Cronin . |
| 3,645,155 | 2/1972 | Robinson . |
| 3,645,992 | 2/1972 | Elston . |
| 3,646,155 | 2/1972 | Scott . |
| 3,651,183 | 3/1972 | Hosoda et al. . |
| 3,711,584 | 1/1973 | Sagane et al. . |
| 3,743,611 | 7/1973 | Muroi et al. . |
| 3,755,208 | 8/1973 | Ehrenfreund . |
| 3,804,684 | 4/1974 | Tokushige et al. . |
| 3,808,300 | 4/1974 | Miyamoto et al. . |
| 3,814,779 | 6/1974 | Wiley . |
| 3,886,100 | 5/1975 | Yasuda et al. . |
| 3,936,518 | 2/1976 | Soda et al. . |
| 3,938,661 | 2/1976 | Carmody . |
| 3,949,028 | 4/1976 | Murakami et al. . |
| 3,953,558 | 4/1976 | Hatano et al. . |
| 3,954,929 | 5/1976 | Hoenke . |
| 3,959,189 | 5/1976 | Kitamori . |
| 3,960,784 | 6/1976 | Rubens . |
| 3,965,054 | 6/1976 | Nojiri et al. . |
| 3,966,381 | 6/1976 | Suh . |
| 3,976,530 | 8/1976 | Callan . |
| 3,996,171 | 12/1976 | Holland et al. . |
| 4,048,275 | 9/1977 | Usamoto et al. . |
| 4,053,341 | 10/1977 | Kleiner et al. . |
| 4,058,583 | 11/1977 | Glander et al. . |
| 4,062,712 | 12/1977 | Stark . |
| 4,076,698 | 2/1978 | Anderson et al. . |
| 4,080,344 | 3/1978 | Ikeda et al. . |
| 4,089,818 | 5/1978 | Slocumb . |
| 4,102,720 | 7/1978 | Kaneko et al. . |
| 4,102,829 | 7/1978 | Watanabe et al. . |
| 4,110,269 | 8/1978 | Ehrenfrueng . |
| 4,117,195 | 9/1978 | Swarbrick et al. . |
| 4,126,598 | 11/1978 | Reighter . |
| 4,142,956 | 3/1979 | Shikinami et al. . |
| 4,146,598 | 3/1979 | Coyne . |
| 4,163,085 | 7/1979 | Kuhnel et al. . |
| 4,168,353 | 9/1979 | Kitamori . |
| 4,181,647 | 1/1980 | Beach . |
| 4,181,762 | 1/1980 | Benedyk . |
| 4,182,398 | 1/1980 | Salyer et al. . |
| 4,203,815 | 5/1980 | Noda et al. . |
| 4,209,473 | 6/1980 | Coyne . |
| 4,211,590 | 7/1980 | Steward et al. . |
| 4,215,202 | 7/1980 | Park . |
| 4,225,650 | 9/1980 | van Brederode et al. . |
| 4,226,946 | 10/1980 | Park et al. . |
| 4,228,255 | 10/1980 | Fujimoto et al. . |
| 4,234,531 | 11/1980 | Jocteur . |
| 4,241,832 | 12/1980 | Bliss . |
| 4,247,651 | 1/1981 | Ohno et al. . |
| 4,275,023 | 6/1981 | Shimizu et al. . |

(List continued on next page.)

FOREIGN PATENT DOCUMENTS

| | | |
|---|---|---|
| 451864 | 10/1948 | Canada . |
| 0 584 927 A2 | 3/1994 | European Pat. Off. . |
| 0 702 032 A2 | 3/1996 | European Pat. Off. . |
| WO 90/03414 | 4/1990 | WIPO . |
| WO 92/14784 | 9/1992 | WIPO . |
| WO 93/03093 | 2/1993 | WIPO . |

OTHER PUBLICATIONS

Ultsch & Fritz, "Crosslinking of LLDPE and VLDPE via graft–polymerized vinyltrimethoxysilane" *Rubber Processing and Application*, 13:81–91, 1990.

Park, "Handbook of Polymeric Foams and Foam Technology, Polyolefin Foam," Oxford University Press, Chapter 9, pp. 156–242 (1987).

*Primary Examiner*—John M. Cooney, Jr.
*Attorney, Agent, or Firm*—Fish & Richardson

[57] ABSTRACT

The invention relates to physically-blown low density polyethylene (LDPE) foams that are blends of an LDPE resin and a silane-grafted single-site initiated polyolefin resin. The LDPE resin generally has a density between about 0.91 and about 0.93 g/cm$^3$ and a melt index greater than 1, and the silane-grafted single-site initiated polyolefin resin generally is a copolymer of ethylene and a $C_3$–$C_{20}$ alpha-olefin that has a density between about 0.86 and about 0.96 g/cm$^3$ and a molecular weight distribution between about 1.5 and about 3.5.

39 Claims, No Drawings

U.S. PATENT DOCUMENTS

| | | |
|---|---|---|
| 4,303,756 | 12/1981 | Kajimura et al. . |
| 4,303,757 | 12/1981 | Kajimura et al. . |
| 4,308,352 | 12/1981 | Knaus . |
| 4,333,898 | 6/1982 | Schmidtchen . |
| 4,337,321 | 6/1982 | Allada . |
| 4,347,329 | 8/1982 | Park . |
| 4,370,378 | 1/1983 | Zabrocki et al. . |
| 4,379,859 | 4/1983 | Hirosawa et al. . |
| 4,389,514 | 6/1983 | Schmidle et al. . |
| 4,399,087 | 8/1983 | Akiyama et al. . |
| 4,429,059 | 1/1984 | Ozutsumi et al. . |
| 4,433,029 | 2/1984 | Senda et al. . |
| 4,440,703 | 4/1984 | Akiyama et al. . |
| 4,443,393 | 4/1984 | Akiyama et al. . |
| 4,444,948 | 4/1984 | Maillefer . |
| 4,446,254 | 5/1984 | Nakae et al. . |
| 4,448,901 | 5/1984 | Senda et al. . |
| 4,464,425 | 8/1984 | Voigt et al. . |
| 4,473,665 | 9/1984 | Martini-Vvedensky et al. . |
| 4,504,534 | 3/1985 | Adachi et al. . |
| 4,510,031 | 4/1985 | Matsumura et al. . |
| 4,515,907 | 5/1985 | McCullough et al. . |
| 4,526,930 | 7/1985 | Keogh . |
| 4,542,164 | 9/1985 | Nishioka et al. . |
| 4,554,293 | 11/1985 | Park . |
| 4,581,383 | 4/1986 | Park . |
| 4,591,606 | 5/1986 | Bergstrom . |
| 4,592,468 | 6/1986 | Wallace . |
| 4,605,682 | 8/1986 | Park . |
| 4,633,361 | 12/1986 | Ela et al. . |
| 4,640,933 | 2/1987 | Park . |
| 4,652,588 | 3/1987 | Park . |
| 4,663,361 | 5/1987 | Park . |
| 4,666,946 | 5/1987 | Fudge . |
| 4,692,471 | 9/1987 | Fudge . |
| 4,694,025 | 9/1987 | Park . |
| 4,694,027 | 9/1987 | Park . |
| 4,702,868 | 10/1987 | Pontiff et al. . |
| 4,709,817 | 12/1987 | Keady et al. . |
| 4,714,716 | 12/1987 | Park . |
| 4,725,492 | 2/1988 | Yazaki et al. . |
| 4,739,547 | 4/1988 | Tanaka et al. . |
| 4,759,992 | 7/1988 | Tomko et al. . |
| 4,762,860 | 8/1988 | Park . |
| 4,767,814 | 8/1988 | Bae et al. . |
| 4,791,143 | 12/1988 | Tanaka et al. . |
| 4,791,147 | 12/1988 | Tanaka et al. . |
| 4,818,789 | 4/1989 | Tomko et al. . |
| 4,824,059 | 4/1989 | Butler . |
| 4,837,272 | 6/1989 | Kelley . |
| 4,850,913 | 7/1989 | Szabad, Jr. . |
| 4,868,044 | 9/1989 | Tanaka et al. . |
| 4,870,111 | 9/1989 | Donuiff et al. . |
| 4,873,042 | 10/1989 | Topcik . |
| 4,900,490 | 2/1990 | Kozma . |
| 4,908,166 | 3/1990 | Salyer . |
| 4,918,111 | 4/1990 | Tanaka et al. . |
| 4,937,284 | 6/1990 | Bergstrom . |
| 4,937,299 | 6/1990 | Ewen et al. . |
| 4,958,770 | 9/1990 | Mitchell . |
| 5,026,736 | 6/1991 | Pontiff . |
| 5,047,476 | 9/1991 | Keogh . |
| 5,053,446 | 10/1991 | Salyer . |
| 5,064,802 | 11/1991 | Stevens et al. . |
| 5,112,919 | 5/1992 | Furrer et al. . |
| 5,132,380 | 7/1992 | Stevens et al. . |
| 5,151,204 | 9/1992 | Struglinski . |
| 5,186,851 | 2/1993 | Gutierrez et al. . |
| 5,206,075 | 4/1993 | Hodgson, Jr. . |
| 5,210,150 | 5/1993 | Prejean . |
| 5,246,783 | 9/1993 | Spenadel et al. . |
| 5,268,115 | 12/1993 | Gutierrez et al. . |
| 5,272,236 | 12/1993 | Lai et al. . |
| 5,275,747 | 1/1994 | Gutierrez et al. . |
| 5,277,833 | 1/1994 | Song et al. . |
| 5,278,264 | 1/1994 | Spaleck et al. . |
| 5,278,272 | 1/1994 | Lai et al. . |
| 5,288,762 | 2/1994 | Park et al. . |
| 5,304,580 | 4/1994 | Shibayama et al. . |
| 5,322,728 | 6/1994 | Davey et al. . |
| 5,329,033 | 7/1994 | Spaleck et al. . |
| 5,340,840 | 8/1994 | Park et al. . |
| 5,345,002 | 9/1994 | Song et al. . |
| 5,350,817 | 9/1994 | Winter et al. . |
| 5,366,647 | 11/1994 | Gutierrez et al. . |
| 5,369,136 | 11/1994 | Park et al. . |
| 5,370,229 | 12/1994 | Kroeckel et al. . |
| 5,376,428 | 12/1994 | Palazzoto et al. . |
| 5,380,810 | 1/1995 | Lai et al. . |
| 5,382,698 | 1/1995 | Song et al. . |
| 5,385,972 | 1/1995 | Yamamoto et al. . |
| 5,387,620 | 2/1995 | Park et al. . |
| 5,391,629 | 2/1995 | Turner et al. . |
| 5,407,965 | 4/1995 | Park et al. . |
| 5,408,004 | 4/1995 | Lai et al. . |
| 5,461,110 | 10/1995 | Arthurs et al. . |
| 5,552,448 | 9/1996 | Kobayashi et al. ............... 521/79 |
| 5,589,519 | 12/1996 | Knaus . |
| 5,604,033 | 2/1997 | Arthurs et al. . |
| 5,604,288 | 2/1997 | Furukawa et al. . |
| 5,612,510 | 3/1997 | Hildreth . |

CROSS-LINKED LOW-DENSITY POLYMER FOAM

BACKGROUND OF THE INVENTION

The invention relates to physically-blown low-density polyethylene (LDPE) foams.

Typical polyethylene foams are manufactured from low-density polyethylene (LDPE) polymer resins with densities of between approximately 0.915 and 0.930 g cm$^{-3}$, produced by free-radical polymerization of ethylene at extremely high pressures and at temperatures typically between 150° and 200° C. The low density of the polymer is due predominantly to branching as a result of extensive radical transfer under the polymerization conditions. LDPE resins are typically softer, more flexible, and have a lower melting range than higher density polyethylenes.

Closed-cell polyethylene foams can be formed by extrusion of a polymer resin mixed with a physical foaming agent, such as a low molecular weight hydrocarbon. Closed-cell foams are foams in which the gas cells are separated by membrane walls of resin. Upon extrusion, the pressure surrounding the mixture drops and the physical foaming agent expands to form gas cells in the resin (i.e., a foam). Desirably, the resulting gas cells are distributed evenly through the foam and are substantially uniform in size. Low density ethylenic polymer foams are described, for example, in Zabrocki, et al., U.S. Pat. No. 4,387,169, which is incorporated herein by reference. Desirable foams have good dimensional stability, i.e., the linear dimensions of the foam do not change substantially over time under ordinary conditions.

Since physical foaming agents can be undesirable in the final product (e.g., due to their flammability), it is important that the foaming agent to be replaced by air in the foam cells, however, the conditions of exchange must be chosen so that the structure of the foam is not altered during the exchange. Factors that influence the exchange can include cell wall thickness, resin composition, and foam article thickness. It is commercially important for the exchange to be complete in a short period of time.

Physically-blown foams with low foam densities and good cushioning properties are useful, for example, in packaging, automotive, construction, contact sports, water sports, and appliance applications. It is generally desired that foams have low foam densities to decrease the cost of material and weight. It is important to maintain good foam properties (e.g., cushioning) at low foam densities.

SUMMARY OF THE INVENTION

In general, the invention features physically-blown LDPE foams that are blends of an LDPE resin and a silane-grafted single-site initiated polyolefin resin. The LDPE resin generally has a density between about 0.91 and about 0.93 g cm$^{-3}$. It is preferred that the silane-grafted single-site initiated polyolefin resin is a copolymer of ethylene and a C$_3$–C$_{20}$ alpha-olefin having a density between about 0.86 and about 0.96 g cm$^{-3}$ and a molecular weight distribution between about 1.5 and about 3.5.

In one aspect, the invention features a physically-blown foam including a polymer blend of a low-density polyethylene resin and at least one silane-grafted single-site initiated polyolefin resin. In preferred embodiments, the foam is cross-linked.

In another aspect, the invention features a physically-blown foam including a polymer blend of a low-density polyethylene resin and at least one silane-grafted single-site initiated polyolefin resin wherein the foam has a tensile strength between 20 and 250 pounds per square inch (psi), a 25% compression resistance (compression deflection) between 3 and 200 psi, and a density between 1.0 and 10 pounds per cubic foot.

It is preferred that at least one silane-grafted single-site initiated polyolefin resin be a copolymer of ethylene and a C$_3$–C$_{20}$ alpha-olefin having a density between about 0.86 and about 0.96 g cm$^{-3}$ and a molecular weight distribution between about 1.5 and about 3.5. In preferred embodiments, the silane-grafted single-site initiated polyolefin resin makes up between about 2 and 30 percent of the polymer blend in the foam, most preferably between about 3 and 18 percent of the polymer blend. In other preferred embodiments, the silane-grafted single-site initiated polyolefin resin makes up greater than 30 percent of the polymer blend. The upper limit of the silane-grafted resin content is limited, in part, by the nature of the extruder.

It is preferred that the silane-grafted single-site initiated polyolefin resin contain between about 0.1 and 1.0 percent silane, more preferably between about 0.3 and 0.6 percent silane. In preferred embodiments, the silane includes a vinyl silane with 2 or 3 hydrolyzable groups. It is preferred that a portion of the foam be cross-linked.

In other preferred embodiments, a portion of the low-density polyethylene is silane-grafted.

In other preferred embodiments, the foam includes a cell nucleating agent, a gas exchange additive, and/or a metal carboxylate. The preferred amount of cell nucleating agent, e.g., talc, in the foam is between about 0.05 percent and 2.0 percent. The preferred amount of gas exchange additive, e.g., zinc stearate, in the foam is between about 0.5 percent and 2.0 percent. The preferred amount of metal carboxylate, e.g., dibutyl tin dilaurate, in the foam is between about 0.005 percent and 1.0 percent.

In preferred embodiments, the foam is in the form of a sheet, plank, laminated plank, or extruded profile.

In another aspect, the invention features a method of making a physically-blown foam including the steps of: providing a blend of a low-density polyethylene resin and at least one silane-grafted single-site initiated polyolefin resin, the blend including a physical-foaming agent; extruding the blend; and expanding the blend to form the foam.

In preferred embodiments, a portion of the blend is grafted with silane. In other preferred embodiments, at least one single-site initiated polyolefin resin is grafted with a silane. In preferred embodiments, the method includes the step of silane-grafting a portion of the blend.

In preferred embodiments, the method further includes the step of subjecting the blend to reagents which alter the resin structure to increase the melt strength of the blend, most preferably by cross-linking at least one of the resins in the blend. It is preferred that the cross-linking result from reaction with moisture. It is preferred that the step of extruding the blend include the blend exiting a die. It is also preferred that the step of cross-linking occur predominantly prior to the step of the blend exiting the die.

The term "low-density polyethylene" or "LDPE," as used herein, means a polymer of ethylene with a density between 0.915 and 0.930 g cm$^{-3}$. Since LDPE is prepared under, for example, free-radical conditions and high pressures, it is highly branched. The term "highly branched," as used herein, means that the polymers have approximately one to two short chain branches for every one hundred carbon atoms in the polymer backbone. Methods of quantifying branching are distinguishable by $^{13}C$ NMR spectroscopy. See, for example, Randall, *Rev. Macromol. Chem. Phys.*, C29 (2 & 3), p. 285–297, incorporated herein by reference.

The term "short-chain branching," as used herein, means a branch of a polymer backbone of 6 carbon atoms or less which can be distinguished by $^{13}C$ NMR spectroscopic methods.

The term "copolymer," as used herein, means a polymer resulting from the polymerization of two or more monomeric species, including terpolymers (e.g., resulting from the polymerization of three monomeric species), sesquipolymers, and greater combinations of monomeric species. Copolymers are generally polymers of ethylene with $C_3$–$C_{20}$ alpha-olefins.

The densities, or specific gravities, of the polymer resins can be measured using ASTM D-792 methods.

The phrase "single-site initiated polyolefin resin," as used herein, means a polyolefin prepared from a single-site initiator that has controlled molecular weights and molecular weight distributions. The polyolefin can be polyethylene or a copolymer of ethylene and alpha-unsaturated olefin monomers. One class of a single-site initiators of particular interest are the metallocene initiators which are described, for example, in J. M. Canich, U.S. Pat. No. 5,026,798, in J. Ewen, et al., U.S. Pat. No. 4,937,299, in J. Stevens, et al., U.S. Pat. No. 5,064,802, and in J. Stevens, et al., U.S. Pat. No. 5,132,380, each of which are incorporated herein by reference. These initiators, particularly those based on group 4 transition metals, such as zirconium, titanium and hafnium, are extremely high activity ethylene polymerization initiators.

The single-site initiators are versatile. The polymerization conditions such as a initiator composition and reactor conditions can be modified to provide polyolefins with controlled molecular weights (e.g., in a range from 200 g mol$^{-1}$ to about 1 million or higher g mol$^{-1}$) and controlled molecular weight distributions (e.g., $M_w/M_n$ in a range from nearly 1 to greater than 8, where $M_w$ is the weight average molecular weight and $M_n$ is the number average molecular weight). Molecular weights and molecular weight distributions of polymers can be determined, for example, by gel permeation chromatography.

The polyolefins provided by these initiators are essentially linear, meaning that the polymers can contain uniformly distributed, highly controlled short chain branching sites. As used herein, the term "essentially linear" means that the polymers have less than about one long-chain branch for every ten thousand carbon atoms in the backbone of the polymer. As described above, one method of determining branching is $^{13}C$ NMR spectroscopy.

When the single-site initiated polyolefins are copolymers, the composition distribution breadth index (CDBI) is generally greater than 50% and most preferably above 70%. The CDBI is a measurement of the uniformity of distribution of comonomers among the individual polymer chains having a comonomers content within 50% of the median bulk molar comonomers content.

The "melt index" (MI) of a polymer resin is a measurement of processability under low shear rate conditions. The MI can be determined by ASTM D-1238 Condition E (190° C./2.16 kg). The MI of the polyolefins is generally between about 0.2 dg/min and about 100 dg/min, preferably, between about 1 dg/min and about 10 dg/min, and most preferably between about 2 dg/min and about 8 dg/min. The melt index of the polymer resins can be measured using ASTM D-1238.

The term "silane-grafted," as used herein, means attaching one or more silicon-containing monomer or polymer to the original polymer chains. The grafting is generally accomplished by forming active grafting sites on the original polymer chains in the presence of silicon-containing monomers, which can further polymerize as branches from the original polymer chains. Active grafting sites can be generated, for example, by free radicals or anions.

The term "closed-cell," as used herein, means that predominantly, greater than approximately 70% of the foam cell volumes have cell walls isolating them from the external atmosphere. One way to determine this is by measuring the amount of water that is absorbed into the foam when the foam is immersed in water.

The term "corrugation," as used herein, means a region of a foam in which the cell walls have ripped during expansion to form wave-shaped channels through the foam. Corrugation is a result of too many cells (or bubbles) forming in the foam at one time. There are too many nucleation sites. Corrugation makes the foam difficult to laminate, decreases the aesthetics of the foam, and leads to variability in the properties of the foam.

The invention can have one or more of the following advantages. Since the single-site initiated polyolefin resins lack branching, or have very low degrees of branching, and have highly regular structures, they have low melt strength and poor resistance to elongation at processing temperatures. In order to produce small and regular cell size, the resin should have a good balance of melt strength and resistance to elongation. Therefore, the addition of a single-site initiated polyolefin resin to a foam composition would be expected to increase cell size and corrugate at the die. By silane-grafting the single-site initiated polyolefin resin, the opposite result can be realized. The foams including silane-grafted single-site initiated polyolefin resins generally have lower foam densities while retaining good strength and other physical foam properties. In general, the cell size of the foams is reduced by 60 to 70 percent upon addition of the silane-grafted single-site initiated polyolefin resin to the LDPE resin. The added polyolefin resin improves the melt strength of the blend, allowing lower density foams to be physically blown.

There is a balance between the foam density and the cell size in the foam. This essentially means that the cells do not tear as readily during foaming. The addition of silane-grafted single-site initiated polyolefin resins to LDPE foam compositions can lead to higher foam flexibility and toughness. The silane-grafting of the polyolefin resin or resin blend allows many of the foam compositions to be recycled.

The increased melt strength of the blend increases the lamination efficiency of the foams. Foam sheets can be heat treated to laminate at the foam—foam interface. The silane-grafted blend increases the temperature resistance of the foam thereby allowing lamination speeds to increase by 30 to 40 percent. Additionally, there can be less thickness loss, or shrinkage, during lamination.

The increased melt strength and smaller cell size that is obtained with these foams contribute to higher cell counts (cells per inch) in the foam. The higher cell counts lead to lower density foams and can be achieved by the addition of more cell nucleating agents, such as talc, for example, to the mixture, without unacceptable corrugation.

Other features and advantages of the invention will be apparent from the following detailed description thereof, and from the claims.

DETAILED DESCRIPTION

The foam is a blend of LDPE and at least one silane-grafted single-site initiated polyolefin resin. The preferred level of silane-grafted single-site initiated polyolefin resin, in weight percent of the total polymeric content of the foam, is preferably between about 2 percent and about 30 percent more preferably between about 3 percent and about 18 percent.

The single-site initiated polyolefin resins are derived from ethylene polymerized with at least one comonomer selected from the group consisting of at least one alpha-unsaturated $C_3$–$C_{20}$ olefin comonomers. Preferably, the alpha-unsaturated olefins contain between 3 and 16 carbon atoms, most preferably between 3 and 8 carbon atoms. Examples of such alpha-unsaturated olefin comonomers used as copolymers with ethylene include, but are not limited to, propylene, isobutylene, 1-butene, 1-hexene, 3-methyl-1-pentene, 4-methyl-1-pentene, 1-octene, 1-decene, 1-dodecene, styrene, halo- or alkyl-substituted styrene, tetrafluoroethylene, vinylcyclohexene, and vinylbenzocyclobutane.

The comonomer content of the polyolefin resins is generally between about 1 mole percent and about 32 mole percent, preferably between about 2 mole percent and about 26 mole percent, and most preferably between about 6 mole percent and about 25 mole percent.

The copolymer can include one or more $C_4$–$C_{20}$ polyene monomers. Preferably, the polyene is a straight-chain, branched chain or cyclic hydrocarbon diene, most preferably having between 6 and 15 carbon atoms. It is also preferred that the diene be non-conjugated. Examples of such dienes include, but are not limited to, 1,3-butadiene, 1,4-hexadiene, 1,6-octadiene, 5-methyl-1,4-hexadiene, 3,7-dimethyl-1,6-octadiene, 3,7-dimethyl-1,7-octadiene, 5-ethylidene-2-norbornene, and dicyclopentadiene. Especially preferred is 1,4-hexadiene.

The preferred single-site initiated polyolefin resins include either ethylene/alpha-unsaturated olefin copolymers or ethylene/alpha-unsaturated olefin/diene terpolymers.

Preferred single-site initiated polyolefin resins are described, for example, in S. -Y. Lai, et al., U.S. Pat. Nos. 5,272,236, 5,278,272, and 5,380,810, in L. Spenadel, et al., U.S. Pat. No. 5,246,783, in C. R. Davey, et al., U.S. Pat. No. 5,322,728, in W. J. Hodgson, Jr., U.S. Pat. No. 5,206,075, and in F. C. Stehling, et al., WO 90/03414, each of which is incorporated herein by reference. The resins contain varying amounts of short-chain and long-chain branching, which depend, in part, on the processing conditions.

Some single-site initiated polyolefin resins are available commercially from Exxon Chemical Company, Houston, Tex., under the tradename Exact™, and include Exact™ 3022, Exact™ 3024, Exact™ 3025, Exact™ 3027, Exact™ 3028, Exact™ 3031, Exact™ 3034, Exact™ 3035, Exact™ 3037, Exact™ 4003, Exact™ 4024, Exact™ 4041, Exact™ 4049, Exact™ 4050, Exact™ 4051, Exact™ 5008, and Exact™ 8002. Other single-site initiated resins are available commercially from Dow Plastics, Midland, Mich. (or DuPont/Dow), under the tradenames Engage™ and Affinity™, and include CL8001, CL8002, EG8100, EG8150, PL1840, PL1845 (or DuPont/Dow 8445), EG8200, EG8180, GF1550, KC8852, FW1650, PL1880, HF1030, PT1409, CL8003, and D8130 (or XU583-00-01). Most preferably, the single-site initiated polyolefin resins are selected from the group consisting of Exact™ 3024, Exact™ 3031, Exact™ 4049, PL1845, EG8200, and EG8180.

LDPE resins are described, for example, in "Petrothene® Polyolefins . . . A Processing Guide," Fifth Edition, Quantum USI Division, 1986, pages 6–16, incorporated herein by reference. Some LDPE resins are commercially available from Exxon Chemical Company, Houston, Tex., Dow Plastics, Midland, Mich., Novacor Chemicals (Canada) Limited, Mississauga, Ontario, Canada, Mobil Polymers, Norwalk, Conn., Rexene Products Company, Dallas, Tex., Quantum Chemical Company, Cincinnati, Ohio, and Westlake Polymers Corporation, Houston, Tex. Commercially available LDPE resins include Eastman 1924P, Eastman 1550F, Eastman 800A, Exxon LD 117.08, Exxon LD 113.09, Dow 535I, Dow 683, Dow 760C, Dow 768I, Dow 537I, Novacor LF219A, Novacor LC05173, Novacor LC0522A, Mobil LMA-003, Mobil LFA-003, Rexene 2018 (7018), Rexene 1023, Rexene XO 875, Rexene PE5050, Rexene PE1076, Rexene PE2030, Quantum NA953, Quantum NA951, Quantum NA285-003, Quantum NA271-009, Quantum NA324, Westlake EF606AA, Westlake EF612, and Westlake EF412AA.

Silane-grafting of the polyolefin resin or resin blend occurs when the polymer backbone is activated and reacts with a silane reagent to form the graft copolymer. The silane-graft can include a subsequently cross-linkable moiety in the graft chain. For example, the cross-linking can occur under warm, moist conditions when the cross-linkable moiety is hydrolyzable, optionally in the presence of a suitable catalyst. Levels of cross-linking can be adjusted by varying the amount of silane-grafting introduced to the polyolefin resin or the polyolefin resin/LDPE blend. The silane-grafting can occur in a separate process, or during a continuous blending and extruding process. Silane-grafting is generally accomplished by adding azido- or vinyl-functional silanes and a graft initiator to the polyolefin resin or blend. The grafting of the polyolefin resin or blend can take place, for example, in an extruder.

The graft initiator can be a free radical generating species, for example, a peroxide. Examples of peroxides include dicumylperoxide, 2,5-dimethyl-2,5-di(t-butylperoxy) hexane, 1,1-bis(t-butylperoxy)-3,3,5-trimethylcyclohexane, 1,1-di-(t-butylperoxy)cyclohexane, 2,2'-bis(t-butylperoxy) diisopropylbenzene, 4,4 '-bis(t-butylperoxy)butylvalerate, t-butylperbenzoate, t-butylperterephthalate, and t-butyl peroxide. Most preferably, the graft initiator is dicumylperoxide or 2,2'-bis(t-butylperoxy)diisopropylbenzene.

Azido- and vinyl-functional silanes have the general formula RR'SiY$_2$, in which R represents an azido- or vinyl-functional radical attached to silicon through a silicon-carbon bond (e.g., composed of carbon, hydrogen, and optionally sulfur, nitrogen and oxygen), each Y represents a hydrolyzable organic radical (e.g., a radical that can be cleaved from silicon by the addition of water); and R' represents a monovalent hydrocarbon radical or a hydrolyzable organic radical.

Azido-functional silane compounds graft onto the polyolefin resin through a nitrene insertion reaction. Suitable azido-functional silanes include the trialkoxysilanes such as 2-(trimethoxysilyl) ethylphenylsulfonyl azide and 6-(triethoxysilyl) hexylsulfonyl azide.

Vinyl-functional silane compounds graft to the polymer resin by free-radical initiated reactions. Suitable vinyl-functional silanes include vinyl-functional alkoxy silanes such a vinyl trimethoxy silane (VTMOS) and vinyl triethoxy silane (VTEOS). Generally during grafting, graft initiators such as the peroxides are included with the vinyl-functional silane to perform a hydrogen abstraction from the polyolefin resin backbone to initiate grafting and polymerization of the vinyl-functional silane.

The graft can include other monomers, such as di- and tri-allyl cyanurates and isocyanurates, alkyl di- and triacrylates and methacrylates, zinc dimethacrylates and diacrylates, styrenes, and butadiene.

The grafted polymer resin can be cross-linked by exposure to moisture to effect silanol condensation reactions of the hydrolyzable groups of the pendant silane-grafts. Cross-linking develops through hydrolysis of the silane Y groups to form silanols which condense to form siloxanes. The condensation of silanols to siloxanes is catalyzed by metal carboxylates such as, for example, dibutyl tin dilaurate or dibutyl tin maleate. The metal carboxylates can be added to the polymer resin mixture before grafting, before blending, before extrusion, or before exiting the die. The metal carboxylates are generally added in a liquid form or compounded in a polymer resin.

Most preferably, the silane is VTMOS, that is grafted on to the polymer backbone by a reaction which is initiated by 2,2'-bis(t-butylperoxy)diisopropylbenzene. The most preferred silanol condensation catalyst is dibutyl tin dilaurate. The cross-linking can be induced by the presence of atmospheric moisture, steam, or hot water. Cross-linking can take place predominantly (e.g., more than 50% of the potential cross-linking) prior to expansion (or extrusion) of the foam. Alternatively, the cross-linking can take place predominantly after expansion of the foam.

Regardless of the method of cross-linking used, acceptable foam articles can only be obtained in certain ranges of cross-linking density or level, which is related to the amount of silane-grafting in the blend. Too much cross-linking prior to foaming can render the foam inelastic, resulting in less than optimal expansion and greater than optimal density for a given level of foaming agent. Too little cross-linking can be detrimental to physical properties such as compression set properties or thermal resistance, for example. It is important to choose cross-linking levels that afford foams with particular desired properties. The silane-grafting and resulting crosslinks increase the melt strength of the composition. The cross-linking levels can be determined by establishing the gel content of the of the composition, for example, by extraction with a solvent such as xylenes.

The expanding medium, or foaming agents, useful in the practice of the present invention physical foaming agents. The term "physical foaming agent," as used herein, means a medium expanding composition that is a gas at temperatures and pressures encountered during the foaming step. Typically, a physical foaming agent is introduced to the polymer blend in the gaseous or liquid state and expands, for example, upon a rapid decrease in pressure.

Physical foaming agents include low molecular weight organic compounds including $C_1$–$C_6$ hydrocarbons such as acetylene, propane, propene, butane, butene, butadiene, isobutane, isobutylene, cyclobutane, cyclopropane, ethane, methane, ethene, pentane, pentene, cyclopentane, pentene, pentadiene, hexane, cyclohexane, hexene, and hexadiene, $C_1$–$C_5$ organohalogens, $C_1$–$C_6$ alcohols, $C_1$–$C_6$ ethers, $C_1$–$C_5$ esters, $C_1$–$C_5$ amines, ammonia, nitrogen, carbon dioxide, neon, or helium. The preferred foaming agents include butane, isobutane, carbon dioxide, and 1,1-difluoroethane (HFC-152a). The preferred physical foaming agent concentration prior to expanding the foam is between 0.5 and 20 percent.

The foam can take virtually any physical configuration, preferably the form of a sheet, plank, or other regular or irregular extruded profile. A foam sheets are extruded from circular dies and have thicknesses between about 1/32 inch and 3/4 inch and widths up to 82 inches. Generally, the polyethylene foams are configured as planks, extruded from flat dies, with plank thicknesses between about 1 inch and 4.5 inches and widths between about 24 inches and 48 inches. The foam planks can be laminated by direct application of heat to the interface between two or more planks. In preferred embodiments, it is not necessary to add an adhesive to the interface to laminate the planks.

The foam can be partially or extensively cross-linked prior to expansion, or can be extensively cross-linked after expansion.

Two additional additives in the foam composition can dramatically effect the properties of the foam. These include gas exchange additives and cell nucleating agents, such as zinc stearate and talc, respectively. The preferred gas exchange additive concentration in the foam is between 0.5 and 2.0 percent. The preferred cell nucleating agent concentration in the foam is between 0.05 and 2.0 percent.

Since the foams have increased melt strength, a smaller cell size and higher cell densities can be achieved in the foam. The higher cell densities lead to lower density foams. Higher cell densities can be achieved by the addition of more cell nucleating agents, such as talc or calcium carbonate, for example, to the mixture, without introducing as much corrugation as would be present in the absence of the silane-grafted polyolefin resin. The cell nucleating agent can provide sites for the growth of a foam cell.

Once expanded, each of the foam cells contains gas of the expanding agent (e.g., isobutane) that can exchange by diffusion with air. This exchange is desirable, since the gas of the expanding agent can have undesirable properties. In the case of isobutane, for example, the flammability of the foam decreases dramatically as the foam ages and the isobutane exchanges with air. It is important that the rate of exchange be controlled to minimize aging time and to maintain the structural integrity of the foam cells. Gas exchange additives, also known as cell-structure stabilizers, such as, for example, fatty acids, fatty acid carboxylate salts (e.g., zinc stearate), fatty acid esters (e.g. glycerol monostearate), or fatty acid amides, assist in the gas exchange process and the aging of the foams.

Other additives, alone or in combination, can be added to the foam compositions, including particulate and fibrous fillers to reinforce, strengthen or modify the rheological properties of the foam composition, antioxidants (e.g., hindered phenolics such as Irganox 1010, phosphites such as Irgafos 168, or polymerized trimethyl-dihydroquinoline such as Agerite AK, Resin D or Flectol H), ultra-violet stabilizers, thermal stabilizers, antistatic components, flame retardants, pigments or colorants, and other processing aids.

Methods of combining the various ingredients of the foamable composition include, for example, melt-blending, diffusion-limited imbibition, or liquid mixing. Any or all of the ingredients can be pulverized or reduced in particle-size by other methods prior to use. Melt-blending can be accomplished in a batchwise process or a continuous process. It is preferred that the blending be carried out with temperature control. Many suitable devices for melt-blending are known to the art, including, for example, mixers with single and multiple Archimedean-screw conveying barrels, high-shear "Banbury" type mixers, and other internal mixers. The object of such blending (or mixing) is to provide a uniform mixture. Components can be introduced to the mixture sequentially at any step during the mixing operation. The mixture includes a physical foaming agent that expands, for example, upon exposure to the sudden release of pressure.

One preferred method of providing a sheet object of this invention involves blending the silane-grafted single-site initiated polyolefin resin with LDPE, extruding and expanding the blend to afford a foam, and cross-linking the foam with moisture. The silane-grafted single-site initiated polyolefin resin can be prepared in a separate process or an independent step.

For example, the single-site initiated polyolefin resin is melt-blended with a 20:1 mixture of vinyl trimethoxy silane (VTMOS) and dicumylperoxide in an extruder to effect the grafting of VTMOS onto the resin. This composition is extruded out of a multiple-strand die face and is then pelletized. The resulting silane-grafted single-site initiated polyolefin resin is melt-blended with ungrafted LDPE resin and other additives, such as gas exchange additives (e.g., zinc stearate), pigments, cell nucleating agents (e.g., talc), cross-linking catalysts (e.g., dibutyl tin dilaurate), or, optionally, antioxidants and stabilizers. The mixture is combined with the physical foaming agent (e.g., isobutane). The blending can occur in a single-screw extruder or a twin-screw extruder. The composition is extruded out of, for example, a coat-hanger die and the foaming agent expands resulting in a fully-expanded foam sheet or plank. The foaming step can be carried out during extrusion or in a subsequent step. The sheet, plank, or board is then placed in humid storage for aging, during which time the foam cross-links due to exposure to moisture and the expanded gas in the foam cells exchanges with air.

Alternatively, the single-site initiated polyolefin resin and the LDPE resin can be blended and silane-grafted in a single step. Optionally, the blend containing silane-grafted material can be extensively cross-linked prior to foaming.

The following specific examples are to be construed as merely illustrative, and not limitive, of the remainder of the disclosure.

EXAMPLE 1

A standard LDPE with a melt index of 2 and a density of 0.918 g cm$^{-3}$ was extruded to give a foam having a density of 1.55 pounds per cubic foot and a thickness of 0.5 inch. The foam was expanded with isobutane and contained glycerol monostearate (1.25 percent) as a gas exchange additive and talc (0.8 percent) as a cell nucleating agent. The average cell count of this foam is 14 cells per inch across the width of the sheet.

A comparable foam containing the standard LDPE resin, used to make the foam described above, and a silane-grafted single-site initiated polyolefin resin was prepared.

The silane-grafted single-site initiated polyolefin resin was prepared by reacting 100 parts of DuPont/Dow Engage™ 8445 with 0.4 parts of vinyl trimethoxy silane (VTMOS) and 0.02 parts of 2,2'-bis(t-butylperoxy)-diisopropylbenzene (Vulcup R, available from Hercules Chemical Co.) as the graft initiator. The grafted resin was prepared in a single screw extruder and pelletized for blending.

The grafted resin, the standard LDPE resin, and a concentrate containing 1 percent (by weight) dibutyl tin dilaurate as the metal carboxylate cross-linking catalyst were introduced in the foaming extruder feed in a weight ratio of 12:88:1. All other conditions and components of the formulation were held constant.

Upon blending the standard LDPE resin with the silane-grafted single-site initiated polyolefin resin, the cell count of the foam immediately increased from 14 cells per inch across the width of the foam (in the non-blended foam) to 19 cells per inch (in the foam of LDPE blended with the silane-grafted single-site initiated resin). The cells in the blended, silane-grafted foam were also rounder and more consistent in cell size than in the non-blended foam. Cell size can be decreased further by adding nucleator to the silane-grafted blend. However, if additional talc is added to the original formulation containing only the standard LDPE resin, corrugation occurs, and the foam is not of usable quality due to variations in thickness and unacceptable physical appearance.

EXAMPLE 2

A standard LDPE with a melt index of 2 and a density of 0.930 g cm$^{-3}$ was extruded to give a foam having a density of 1.65 pounds per cubit foot and a thickness of 0.5 inch. The foam was expanded with isobutane and contained glycerol monostearate (1.25 percent) as a gas exchange additive and talc (0.8 percent) as a cell nucleating agent. The average cell count of this foam is 14 cells per inch across the width of the sheet.

A comparable foam containing a silane-grafted blend of the standard LDPE resin, used to make the foam described above, and a single-site initiated polyolefin resin was prepared.

The silane-grafted resin was prepared by dry blending 50 parts of DuPont/Dow Engage™ 8445 with 50 parts of the standard LDPE resin. The blend was silane-grafted by the reaction of the blend with 0.4 parts of vinyl trimethoxy silane (VTMOS) and 0.02 parts of 2,2'-bis(t-butylperoxy)-diisopropylbenzene (Vulcup R, available from Hercules Chemical Co.) as the graft initiator. The grafted resin was prepared in a single screw extruder and pelletized for blending.

The grafted resin blend, the standard LDPE resin, and a concentrate containing 1 percent (by weight) dibutyl tin dilaurate as the metal carboxylate cross-linking catalyst were introduced in the foaming extruder feed in a weight ratio of 12:88:1. All other conditions and components of the formulation are held constant.

Upon addition of the silane-grafted blend, the cell count of the foam immediately increased from 14 cells per inch across the width of the foam (in the non-grafted foam) to 19 cells per inch (in the foam including the silane-grafted blend). The cells in the silane-grafted foam were rounder and more consistent in cell size than in the non-grafted foam.

Other embodiments are within the claims.

What is claimed is:

1. A physically-blown foam comprising a polymer blend of a low-density polyethylene resin and at least one silane-grafted single-site initiated polyolefin resin.

2. The foam of claim 1, wherein the silane-grafted single-site initiated polyolefin resin is a copolymer of ethylene and a $C_3$–$C_{20}$ alpha-olefin having a density between about 0.86 and about 0.96 g cm$^{-3}$ and a molecular weight distribution between about 1.5 and about 3.5.

3. The foam of claim 1, wherein a portion of the foam is cross-linked.

4. The foam of claim 1, wherein the silane-graftedsingle-site initiated polyolefin resin comprises between about 2 and 30 percent of the polymer blend.

5. The foam of claim 1, wherein the silane-grafted single-site initiated polyolefin resin comprises between about 3 and 18 percent of the polymer blend.

6. The foam of claim 1, wherein the silane-grafted single-site initiated polyolefin resin comprises greater than 30 percent of the polymer blend.

7. The foam of claim 1, wherein the silane-grafted single-site polyolefin resin contains between about 0.1 and 1.0 percent silane.

8. The foam of claim 1, wherein the silane-grafted single-site polyolefin resin contains between about 0.3 and 0.6 percent silane.

9. The foam of claim 1, wherein the silane includes a vinyl silane with 2 or 3 hydrolyzable groups.

10. The foam of claim 1, wherein a portion of the low-density polyethylene is silane-grafted.

11. The foam of claim 1, further comprising a cell nucleating agent.

12. The foam of claim 1, further comprising a gas exchange additive.

13. The foam of claim 1, further comprising a metal carboxylate.

14. The foam of claim 1, further comprising a cell nucleating agent, a gas exchange additive, and a metal carboxylate.

15. The foam of claim 1, wherein the foam is in the form of a sheet, plank, laminated plank, or extruded profile.

16. A method of making a physically-blown silane-grafted foam comprising the steps of:

providing a blend of a low-density polyethylene resin and at least one silane-grafted single-site initiated polyolefin resin, the blend further comprising a physical-foaming agent;

extruding the blend; and expanding the blend to form the foam.

17. The method of claim 16, wherein a portion of the blend is grafted with silane.

18. The method of claim 16, further comprising the step of silane-grafting a portion of the blend.

19. The method of claim 17, wherein the silane includes a vinyl silane with 2 or 3 hydrolyzable groups.

20. The method of claim 17, further comprising subjecting the blend to reagents which alter the resin structure to increase the melt strength of the blend.

21. The method of claim 20, comprising cross-linking at least one of the resins.

22. The method of claim 21, wherein the cross-linking results from reaction with moisture.

23. The method of claim 21, wherein the step of extruding the blend includes the blend exiting a die.

24. The method of claim 23, wherein the step of cross-linking occurs predominantly during the step of the blend exiting the die.

25. A physically-blown foam comprising a polymer blend of a low-density polyethylene resin and at least one silane-grafted single-site initiated polyolefin resin wherein the foam has a tensile strength between 20 and 250 psi, a 25% compression resistance between 3 and 200, and a density between 1.0 and 10 pounds per cubic foot.

26. The foam of claim 25, wherein the silane-grafted single-site initiated polyolefin resin is acopolymer of ethylene and a $C_3$–$C_{20}$ alpha-olefin having a density between about 0.86 and about 0.96 g $cm^{-3}$ and a molecular weight distribution between about 1.5 and about 3.5.

27. The foam of claim 25, wherein the silane-grafted single-site initiated polyolefin resin comprises between about 2 and 30 percent of the polymer blend.

28. The foam of claim 25, wherein the silane-grafted single-site initiated polyolefin resin comprises between about 3 and 18 percent of the polymer blend.

29. The foam of claim 25, wherein the silane-grafted single-site polyolefin resin contains between about 0.1 and 1.0 percent silane.

30. The foam of claim 25, wherein the silane-grafted single-site polyolefin resin contains between about 0.3 and 0.6 percent silane.

31. The foam of claim 25, wherein the silane includes a vinyl silane with 2 or 3 hydrolyzable groups.

32. The foam of claim 25, wherein a portion of the low-density polyethylene is silane-grafted.

33. The foam of claim 25, further comprising a cell nucleating agent.

34. The foam of claim 25, further comprising a gas exchange additive.

35. The foam of claim 25, further comprising a metal carboxylate.

36. The foam of claim 25, further comprising a cell nucleating agent, a gas exchange additive, and a metal carboxylate.

37. The foam of claim 25, wherein the foam is in the form of a sheet, plank, laminated plank, or extruded profile.

38. The method of claim 16, wherein the silane-grafted single-site initiated polyolefin resin is a copolymer of ethylene and a $C_3$–$C_{20}$ alpha-olefin having a density between about 0.86 and about 0.96 g $cm^{-3}$ and a molecular weight distribution between about 1.5 and about 3.5.

39. A method of reducing cell size of a physically-blown foam comprising a low-density polyethylene resin, the method comprising the step of:

blending a low-density polyethylene resin and at least one silane-grafted single-site initiated polyolefin resin and a physical-foaming agent;

extruding the blend; and expanding the blend to form the foam, wherein the cell size of the physically-blown foam is reduced by 60 to 70 percent upon addition of the silane-grafted single-site initiated polyolefin resin to the low-density polyolefin resin.

* * * * *